United States Patent
Tochev et al.

(10) Patent No.: US 12,054,191 B2
(45) Date of Patent: Aug. 6, 2024

(54) ARRANGEMENT OF A STEERING DEVICE

(71) Applicants: Ivan Tochev, Vienna (AT); Patrick Neuhauser, Vienna (AT)

(72) Inventors: Ivan Tochev, Vienna (AT); Patrick Neuhauser, Vienna (AT)

( * ) Notice: Subject to any disclaimer, the term of this patent is extended or adjusted under 35 U.S.C. 154(b) by 32 days.

(21) Appl. No.: 17/774,044

(22) PCT Filed: Nov. 4, 2020

(86) PCT No.: PCT/EP2020/080885
§ 371 (c)(1),
(2) Date: May 3, 2022

(87) PCT Pub. No.: WO2021/089583
PCT Pub. Date: May 14, 2021

(65) Prior Publication Data
US 2022/0379946 A1  Dec. 1, 2022

(30) Foreign Application Priority Data
Nov. 8, 2019 (AT) .............................. A 50956/2019

(51) Int. Cl.
*B62D 1/10* (2006.01)
*B62D 1/16* (2006.01)
*B62D 5/00* (2006.01)

(52) U.S. Cl.
CPC ............... *B62D 1/105* (2013.01); *B62D 1/16* (2013.01); *B62D 5/006* (2013.01)

(58) Field of Classification Search
CPC . B62D 1/10; B62D 1/105; B62D 1/16; B62D 1/166; B62D 5/006; B62D 5/04; B62D 5/0409; B62D 5/0412; B62D 5/046
See application file for complete search history.

(56) References Cited

U.S. PATENT DOCUMENTS 4,572,313 A * 2/1986 Ono ..................... B62D 1/105
74/498
4,578,592 A * 3/1986 Nakazawa ............ B60R 16/027
200/61.57

(Continued)

FOREIGN PATENT DOCUMENTS

CN  105774894 A  7/2016
CN  107933684 A  4/2018

(Continued)

OTHER PUBLICATIONS

AT Office Action dated Apr. 1, 2020 of Application No. A 50956/2019.

(Continued)

*Primary Examiner* — Laura Freedman
(74) *Attorney, Agent, or Firm* — Gordon & Jacobson, P.C.

(57) ABSTRACT

An arrangement of a steering device is provided for use with a steering system of a vehicle, which includes a rigid steering part and a rotatable steering part. The arrangement includes a steering wheel coupled to the rotatable steering part via a transmission, and a motor configured to rotate the rotatable steering part. The transmission includes a first machine element, a second machine element, and a third machine element. The first machine element is rotationally connected to the rotatable steering part, the second machine element is rotationally connected to the steering wheel, and the third machine element couples the first machine element to the second machine element. The third machine element is mounted for rotation about an axis of rotation, wherein the axis of rotation is arranged rigidly relative to the rigid steering part.

18 Claims, 2 Drawing Sheets

(56) References Cited

U.S. PATENT DOCUMENTS

| | | | |
|---|---|---|---|
| 4,608,550 A | 8/1986 | Umebayashi et al. | |
| 5,072,628 A | 12/1991 | Oki | |
| 6,053,270 A * | 4/2000 | Nishikawa | B62D 1/10 |
| | | | 701/41 |
| 6,145,402 A | 11/2000 | Nishitani | |
| 6,892,605 B2 * | 5/2005 | Menjak | B62D 5/006 |
| | | | 74/552 |
| 7,249,650 B2 * | 7/2007 | Fukushima | B62D 5/006 |
| | | | 701/41 |
| 7,648,004 B1 | 1/2010 | Larouche et al. | |
| 8,230,964 B2 * | 7/2012 | Markfort | B62D 5/008 |
| | | | 180/443 |
| 8,631,896 B2 * | 1/2014 | Markfort | B62D 5/008 |
| | | | 180/443 |
| 8,839,903 B2 * | 9/2014 | Markfort | B62D 1/10 |
| | | | 180/443 |
| 8,967,320 B2 * | 3/2015 | Markfort | B62D 5/008 |
| | | | 180/443 |
| 10,773,745 B2 * | 9/2020 | Wilske | B62D 5/0403 |
| 11,345,394 B2 * | 5/2022 | Moulaire | B62D 6/006 |
| 11,407,436 B2 * | 8/2022 | Scheick | B62D 1/046 |
| 2006/0149446 A1 | 7/2006 | Nelson | |
| 2006/0202462 A1 | 9/2006 | Menjak et al. | |
| 2006/0286944 A1 | 12/2006 | Songwe | |
| 2007/0118263 A1 | 5/2007 | Nelson | |
| 2011/0088962 A1 | 4/2011 | Huang | |
| 2012/0130596 A1 | 5/2012 | Davis et al. | |
| 2012/0144947 A1 | 6/2012 | Herbert et al. | |
| 2013/0298716 A1 | 11/2013 | Salvini | |
| 2014/0214275 A1 | 7/2014 | Miller et al. | |
| 2016/0214643 A1 | 7/2016 | Joughin | |
| 2016/0280250 A1 | 9/2016 | Stahle | |
| 2017/0129533 A1 | 5/2017 | Naspolini et al. | |
| 2017/0174246 A1 | 6/2017 | Kossakovsk et al. | |
| 2017/0261988 A1 | 9/2017 | Owens et al. | |
| 2018/0105200 A1 | 4/2018 | Joughin | |
| 2018/0178835 A1 | 6/2018 | Toko | |
| 2018/0201299 A1 * | 7/2018 | Ashtari | F16H 1/06 |
| 2019/0001899 A1 | 1/2019 | Cadalora et al. | |
| 2019/0202496 A1 | 7/2019 | Menjak et al. | |
| 2022/0063707 A1 * | 3/2022 | Markfort | B62D 6/00 |

FOREIGN PATENT DOCUMENTS

| | | |
|---|---|---|
| CN | 207292117 U | 5/2018 |
| CN | 109677484 A | 4/2019 |
| DE | 3420358 A1 | 1/1985 |
| DE | 102006003430 A1 | 7/2007 |
| EP | 1323617 A1 | 7/2003 |
| FR | 2305771 A1 | 10/1976 |
| FR | 2896472 A1 | 7/2007 |
| FR | 3000273 A1 | 6/2014 |
| IT | M020120156 A1 | 12/2013 |
| JP | H01249574 A | 10/1989 |
| JP | 2004182061 A | 7/2004 |
| KR | 20080088075 A | 10/2008 |
| WO | 2010115707 A1 | 10/2010 |
| WO | 2018087096 A1 | 5/2018 |
| WO | 2018197153 A1 | 11/2018 |
| WO | 2018221507 A1 | 12/2018 |
| WO | 2019135056 A1 | 7/2019 |

OTHER PUBLICATIONS

PCT Search Report and Written Opinion dated Feb. 17, 2021 of application No. PCT/EP2020/080885.

\* cited by examiner

US 12,054,191 B2

ARRANGEMENT OF A STEERING DEVICE

CROSS-REFERENCE TO RELATED APPLICATION(S)

This application is the National Stage of International Patent Application No. PCT/EP2020/080885 filed on Nov. 4, 2020, which claims priority from Austrian Patent Application No. A50956/2019 filed on Nov. 8, 2019, both of which are herein incorporated by reference in their entireties.

BACKGROUND

The invention relates to an arrangement of a steering device, a steering device, a steering wheel and a vehicle.

Different steering devices are known from the state of the art. For example, steering devices are known where the conventional steering wheel is in frictional contact with a motor, such as a friction wheel motor, for steering the vehicle. However, a disadvantage of such steering devices is that they require a lot of space in the cockpit of the vehicle. Since space in the cockpits of most vehicles is limited, such installation is usually not practical, especially for comfort reasons. Moreover, conventional steering devices are usually inseparably connected to the vehicle and in particular to the vehicle's steering wheel. Quick removal and installation of the steering device is therefore not possible, which means that a separate steering device has to be installed in each vehicle.

SUMMARY

The object of the invention is to overcome the disadvantages of the state of the art. In particular, it is an object of the invention to create a compact steering device with an integrated operating unit. Furthermore, the steering device should be quick and easy to install in and remove from a vehicle.

The object of the invention is solved in particular by the features of the independent patent claims.

The invention relates in particular to an arrangement of a steering device on a steering system of a vehicle, wherein the steering system comprises a rigid steering part and a rotatable steering part, in particular a steering column, wherein the position of at least one vehicle wheel can be adjusted by rotating the rotatable steering part, and wherein the rotatable steering part can be rotated relative to the rigid steering part.

Preferably, it is provided that the steering device comprises a steering wheel, that the steering device is connected, in particular releasably, to the rigid steering part and the rotatable steering part, that the steering device comprises a motor, which is configured to rotate the rotatable steering part, that the steering wheel is coupled to the rotatable steering part via a transmission, that the transmission comprises a first machine element, which is rotationally connected to the rotatable steering part and is in particular formed as a toothed wheel, that the transmission comprises a second machine element, which is rotationally connected to the steering wheel and is in particular formed as a toothed wheel, that the first machine element is coupled to the second machine element via a third machine element, which is in particular formed as a toothed wheel and which is mounted rotatably about an axis of rotation, and that the axis of rotation of the third machine element is arranged rigidly relative to the rigid steering part.

In the context of the present invention, a steering device may be understood to mean in particular an automatic steering system, a steering assistant and/or a steering aid. In other words, the steering device may be configured to steer the vehicle, in particular autonomously, and/or to support the steering movements of the vehicle driver.

The steering system of the vehicle may be a conventional steering system comprising a rotatable steering part, such as a steering column. Preferably, the rotatable steering part is a rod-shaped or tubular support, which can be connected to the conventional steering wheel on the upper end.

Preferably, the movement, in particular the rotation, of the rotatable steering part allows the position of at least one vehicle wheel to be adjusted and thus the direction of travel of the vehicle to be influenced.

Optionally, the movement of the rotatable steering part is transmitted to the steering linkage of the vehicle wheels. The rotatable steering part may be arranged in front of the driver seat in the direction of travel and may preferably extend obliquely from the position of the steering wheel to the steering linkage.

Further, the steering system may comprise a rigid steering part, which is immobile during the rotation of the rotatable steering part. In other words, the rotatable steering part can optionally be rotated to adjust at least one position of a vehicle wheel, the rigid steering part being immobile during the rotation of the rotatable steering part. The immobile part, in the present case the rigid steering part, may thus be unaffected by the rotation of the moved part, in the present case the rotatable steering part, but may be moved by other movements, such as by the driving of the vehicle with the vehicle.

The rigid steering part may be immovably, rigidly or firmly connected to the vehicle, in particular the dashboard. In particular, the rigid steering part has no degree of freedom relative to the vehicle, in particular the dashboard. Optionally, the rigid steering part is immobile relative to the vehicle, in particular the dashboard.

Further, the rotatable steering part may be rotatable relative to the rigid steering part. In other words, the rotatable steering part may rotate independently of the rigid steering part.

The steering device may comprise a steering wheel and a motor. Preferably, the steering wheel is an integral part of the steering device. Optionally, the rotatable steering part is rotatable by the drive of the motor. The steering wheel of the steering device can be connected or connectable to the rotatable steering part, so that the position of at least one vehicle wheel can be adjusted by the rotation of the steering wheel.

In particular, at least one part of the steering device is connected to the rigid steering part and at least one other part of the steering device is connected to the rotatable steering part. In other words, the steering device may be connected to both the rigid steering part and the rotatable steering part at the same time when the steering device is connected to the steering system.

Preferably, those parts of the steering device that are to be independent of the rotation of the steering wheel are connected to the rigid steering part. Preferably, those parts of the steering device that are rotated by the rotation of the rotatable steering part and/or the steering wheel are connected to the rotatable steering part.

The first machine element, in particular a first toothed wheel or a first gear rim, may be connected, in particular releasably, to the rotatable steering part. In particular, the first machine element may be configured to be connected to the rotatable steering part in a force-fitting, material-fitting and/or form-fitting manner.

The second machine element, in particular a second toothed wheel or a second gear rim, may be connected or connectable to the steering wheel. In particular, the second machine element may be configured to be connected to the steering wheel in a force-fitting, material-fitting and/or form-fitting manner.

The first machine element can be connected or connectable to the second machine element, in particular exclusively, via the third machine element, preferably via the motor.

Preferably, the third machine element is connected or connectable to the rigid steering part. In particular, a part, in particular the motor, comprises the third machine element, this part, in particular the motor, being connected or connectable to the rigid steering part. Thereby, the axis of rotation of the third machine element may be unaffected by a rotation of the steering wheel. The position of the axis of rotation of the third machine element may thus be immobile relative to the rigid steering part.

In all embodiments, it may be provided that the third machine element is formed as a part of the motor and that the third machine element connects the steering wheel to the rotatable steering part.

In particular, the steering wheel is in contact with the rotatable steering part, preferably exclusively, via the third machine element, in particular the motor. The third machine element may be formed as a transformer element, a gear wheel, a toothed wheel, a bevel wheel, a motor shaft, a motor pinion, or the like.

Optionally, the first and second machine elements may be connected via multiple machine elements, wherein the axes of rotation of these multiple machine elements are arranged rigidly relative to the rigid steering part.

Optionally, the steering wheel may be in, preferably form-fitting, engagement with the third machine element, in particular the motor, via the second machine element, and the third machine element, in particular the motor, may be in, preferably form-fitting, engagement with the rotatable steering part via the first machine element. Thus, a rotational movement of the steering wheel can optionally be transmitted to the third machine element and the rotational movement of the third machine element can optionally be transmitted to the rotatable steering part.

It may be provided that a rotation of the steering wheel can be transmitted to the rotatable steering part and the motor at the same time via the third machine element. In case the third machine element is formed as motor, a rotation of the steering wheel can be transmitted to the rotatable steering part via the motor.

Preferably, it may be provided that a rotation of the motor can be transmitted both to the rotatable steering part and the steering wheel.

It may also be provided that the motor is connected, in particular exclusively, to the first or second machine element. It may also be provided that only one machine element is driven by the motor.

The steering device may be configured to be installed in a conventional vehicle, in particular to be mounted to a conventional steering system. This may permit a conventional vehicle to be fitted with a steering device according to the invention or to retrofit the steering device according to the invention in a conventional vehicle.

Optionally, it is provided that the first machine element and the second machine element are arranged in particular concentrically, that optionally the first machine element substantially corresponds to the second machine element, that optionally the axes of rotation of the first machine element and the second machine element substantially correspond to the axis of rotation of the rotatable steering part, and that optionally the first machine element and the second machine element extend substantially orthogonally to the axis of rotation of the rotatable steering part.

Preferably, the third machine element is configured to transmit the force from the first to the second machine element.

Optionally, the first machine element and the second machine element are substantially identical. Further, the first machine element and the second machine element may be arranged concentrically and may have substantially the same axis of rotation. In particular, the axes of rotation of the first machine element and the second machine element may extend substantially parallel to the axis of rotation of the rotatable steering part. Preferably, the axes of rotation of the first machine element and the second machine element substantially correspond to the axis of rotation of the rotatable steering part.

In particular, the first machine element and the second machine element are formed as toothed wheels or gear rims. The top surfaces of these two machine elements may extend orthogonally with respect to the axis of rotation of the rotatable steering part.

In particular, it is provided that the steering device and/or the steering wheel is or are arranged substantially orthogonally to the axis of rotation of the rotatable steering part.

In the context of the present invention, the axis of rotation of the rotatable steering part may extend substantially parallel to the longitudinal extension of the rotatable steering part.

For greater clarity, in the context of the present invention, the two machine elements may be understood to mean the first and second machine elements.

Optionally, it is provided that the steering device comprises a steering device housing, that the steering device housing is connected, in particular releasably, to the rigid steering part, and that the steering device housing extends at least partially between the first and the second machine elements.

At least one part of the steering device may be arranged between the first machine element and the second machine element, this part being connected in particular to the rigid steering part. Preferably, at least one part, in particular the bottom plate, of the steering device housing is provided between the first machine element and the second machine element.

The first machine element may be arranged within the steering device housing and/or may be surrounded by the steering device housing. In particular, the first machine element is connected to the rotatable steering part in a form-fitting and/or force-fitting manner.

The rotatable steering part may end within the steering device housing. Preferably, the free shaft extension of the rotatable steering part is surrounded by the steering device housing. Preferably, the rotatable steering part penetrates, in particular exclusively, one face of the steering device housing.

The second machine element may be arranged outside the steering device housing. In particular, the second machine element is connected to the steering wheel in a form-fitting, force-fitting and/or material-fitting manner. Optionally, the steering wheel and the second machine element are formed as one part, in particular in one piece.

Optionally, the first machine element is connected to the second machine element, in particular in a form-fitting and/or force-fitting manner, in particular exclusively, via the third machine element, in particular the motor.

In all embodiments, it may be provided that the third machine element and the motor are connected to and/or engaged with the first and/or the second machine element.

Preferably, the first machine element and the second machine element are connected to each other, in particular exclusively, via the motor pinion of the motor.

Preferably, it is provided that the position of the steering device housing is independent of the position and/or rotation of the steering wheel and/or the rotatable steering part. The steering wheel may thus be rotated relative to the steering device housing. Preferably, the steering device housing remains immobile when the steering wheel and/or the rotatable steering part are rotated.

Optionally, it is provided that the steering wheel of the steering device is connected, in particular releasably, exclusively to the rotatable steering part.

Optionally, it is provided that the steering device housing is connected, in particular releasably, exclusively to the rigid steering part.

Optionally, it is provided that the third machine element, in particular the motor shaft or the motor pinion, protrudes through the steering device housing and connects the first and the second machine element.

Optionally, it is provided that the steering device housing, in particular the bottom plate of the steering device housing, preferably exclusively, has an opening for the third machine element, in particular the motor pinion, and/or an opening for the lines configured to connect the steering device to the vehicle.

In the context of the present invention, a line may be understood to mean an article for transporting electrical energy or an article for transmitting signals.

Optionally, it is provided that the axis of rotation of the third machine element extends substantially parallel or orthogonally to the axis of rotation of the rotatable steering part, and/or that the axis of rotation of the steering wheel substantially corresponds to the axis of rotation of the rotatable steering part.

Preferably, the axis of rotation of the third machine element extends substantially parallel to and spaced apart from the axis of rotation of the rotatable steering part.

Optionally, it is provided that the steering device comprises at least one steering device part, such as in particular at least one steering sensor, at least one antenna, at least one control device and/or at least one battery, and that the at least one steering device part is connected, in particular exclusively, to the steering device housing.

In particular, the mechanical and/or electronical steering device parts required for the functioning of the steering device are arranged on the steering device, preferably on the steering device housing. The steering device parts, which are arranged on the steering device housing, may rest immobile when the steering wheel and/or the rotatable steering part is or are rotated.

For better reception, the GNSS/GPS antenna may be located on the vehicle itself, in particular on the vehicle roof or the vehicle body. Preferably, it is provided that the parts arranged outside the steering device can be connected, in particular wirelessly, to the steering device.

The control device of the steering device may be designed as a computer. In particular, the control device is configured to control the motor, preferably the steering system of the vehicle. Optionally, the control device may, in particular wirelessly, receive and evaluate location data. Optionally, the control device may be connected to at least one operating device and receive and evaluate the signals input via the operating device.

Optionally, it is provided that the rotatable steering part is surrounded by the rigid steering part, and/or that the rigid steering part extends substantially parallel to the axis of rotation of the rotatable steering part, and/or that the rotatable steering part, in particular the steering column, is arranged in the rigid steering part.

Preferably, the rotatable steering part is formed as steering shaft, which is connected to at least one vehicle wheel. Preferably, the rigid steering part is formed as a tube or sleeve, wherein the steering shaft is arranged in the tube or sleeve.

Optionally, it is provided that the steering device comprises at least one operating device, such as in particular a touch screen and/or a button, that the at least one operating device is connected to the rigid steering part, in particular via the steering device housing, whereby the at least one operating device is immobile during the rotation of the steering wheel and the rotatable steering part, that optionally that at least one operating device is arranged substantially orthogonally to the axis of rotation of the rotatable steering part, and that the at least one operating device is configured to operate the steering device and/or the vehicle.

The steering device may comprise at least one operating device. To ensure that the at least one operating device can also be operated during rotation of the steering wheel and/or the rotatable steering part, the at least one operating device may be connected to the rigid steering part. As a result, the rotation of the steering wheel and/or the rotatable steering part can be decoupled from any movement of the at least one operating device.

In other words, the position of the at least one operating device and/or of the steering device housing may remain unchanged while the steering wheel and/or the rotatable steering part is or are rotated.

Further, the at least one operating device may be configured to be operated by the vehicle driver. The operating device may be arranged above the end of the rotatable steering part.

The steering device housing and the at least one operating device are arranged in particular in the center of the steering wheel. For example, the at least one operating device may be an emergency stop switch, a touch screen, a display, a switch, a button and/or the like.

The vehicle and/or the steering device, in particular the at least one control device, may be controlled via the at least one operating device.

However, it may also be provided that the steering device is configured to be operated by a mobile device, such as in particular a smartphone or a tablet.

Optionally, it is provided that the steering device is designed to be removable, which enables the removal of the steering device from the steering system, in particular from the rigid and the rotatable steering parts.

Preferably, the steering device is configured to be quickly and easily installed and removed from the vehicle.

The steering device may be configured to be removed from the steering system, in particular the rigid and the rotatable steering parts. For example, it may thus be possible to simply replace the steering device by a conventional steering wheel.

To comply with legal requirements, the steering device can be removed from the vehicle and a normal steering wheel installed in the vehicle. Thus, the vehicle may drive on a regular road. Away from regular roads, for example on a private property, the normal steering wheel can be replaced by the steering device according to the invention.

Further, the quick and easy installation and removal can make it possible to use one steering device for several vehicles. Furthermore, removing the steering device may prevent the steering device to be stolen from the vehicle.

Optionally, it is provided that a first connecting device, in particular a quick coupling, is arranged on the rigid steering part in a force-fitting, form-fitting and/or material-fitting manner, and that the steering device housing is connected, in particular releasably, to the rigid steering part via the first connecting device.

Optionally, it is provided that a second connecting device, in particular a toothed wheel, is arranged on the rotatable steering part in a force-fitting, form-fitting and/or material-fitting manner, and that the first machine element, the third machine element, the second machine element and/or the steering wheel is or are connected, in particular releasably, to the rotatable steering part via the second connecting device.

The steering device may be easily and quickly separable from the first and/or second connecting device.

The first connecting device, in particular a quick coupling, may be arranged on the rigid steering part in a force-fitting, form-fitting and/or material-fitting manner.

Preferably, the first connecting device is configured for the connection to the steering device housing. In particular, the steering device housing may be connected to the rigid steering part in a form-fitting and/or force-fitting manner via the first connecting device. Optionally, the steering device housing is free of degrees of freedom to the first connecting device when the steering device is connected to the first connecting device.

The first connecting device may be surrounded by the steering device housing and/or may be arranged within the steering device housing.

The second connecting device, in particular a toothed wheel, may be arranged on the rotatable steering part. Preferably, the second connecting device is configured for the connection to the first machine element. In particular, the first machine element may be connected to the rotatable steering part in a form-fitting manner via the second connecting device.

The second connecting device may be arranged outside the steering device housing.

Optionally, the first machine element has a receiving opening. Optionally, the first machine element is connected to a further steering device part, in particular a connecting plate, the further steering device part having a receiving opening. Preferably, the receiving opening is configured to form-fittingly receive the second connecting device.

Optionally, the first machine element is free of degrees of freedom to the second connecting device when the steering device is connected to the second connecting device.

Preferably, the steering device is connected simultaneously, in particular via the first connecting device, to the rigid steering part and, in particular via the second connecting device, to the rotatable steering part.

Optionally, it is provided that the steering device is connected, in particular releasably, to the vehicle, a battery and/or a GNSS/GPS receiving device via a connecting element, in particular a plug, and that the at least one line leading to the connecting element is connected to the steering device housing and optionally to the first connecting device, whereby the at least one line is immobile during the rotation of the steering wheel and the rotatable steering part.

Thus, the lines may optionally be independent of the rotation of the steering wheel and/or the rotatable steering part.

It may be provided that the steering device itself comprises a battery and/or a GNSS/GPS receiving device. Thus, a connecting element, such as a plug, may optionally be omitted.

In particular, the steering device may be completely independent of the vehicle, in particular the vehicle electronics.

Optionally, it is provided that the vehicle is an agricultural machine, such as in particular a tractor, a combine, a front loader, or the like.

In particular, the invention relates to a steering device, wherein the steering device is configured to be used in the arrangement according to the invention.

In particular, the invention relates to a steering wheel, wherein the steering wheel is configured to be connected to the rigid steering part, in particular the second connecting device, of the arrangement according to the invention.

In particular, the invention relates to a vehicle, wherein the vehicle comprises an arrangement according to the invention.

Further features according to the invention optionally emerge from the claims, the description of the exemplary embodiments and the figures.

The invention is now explained in more detail on the basis of non-exclusive and/or non-limiting exemplary embodiments with reference to the following figures.

DETAILED DESCRIPTION OF THE PREFERRED EMBODIMENTS

Figure 1A:
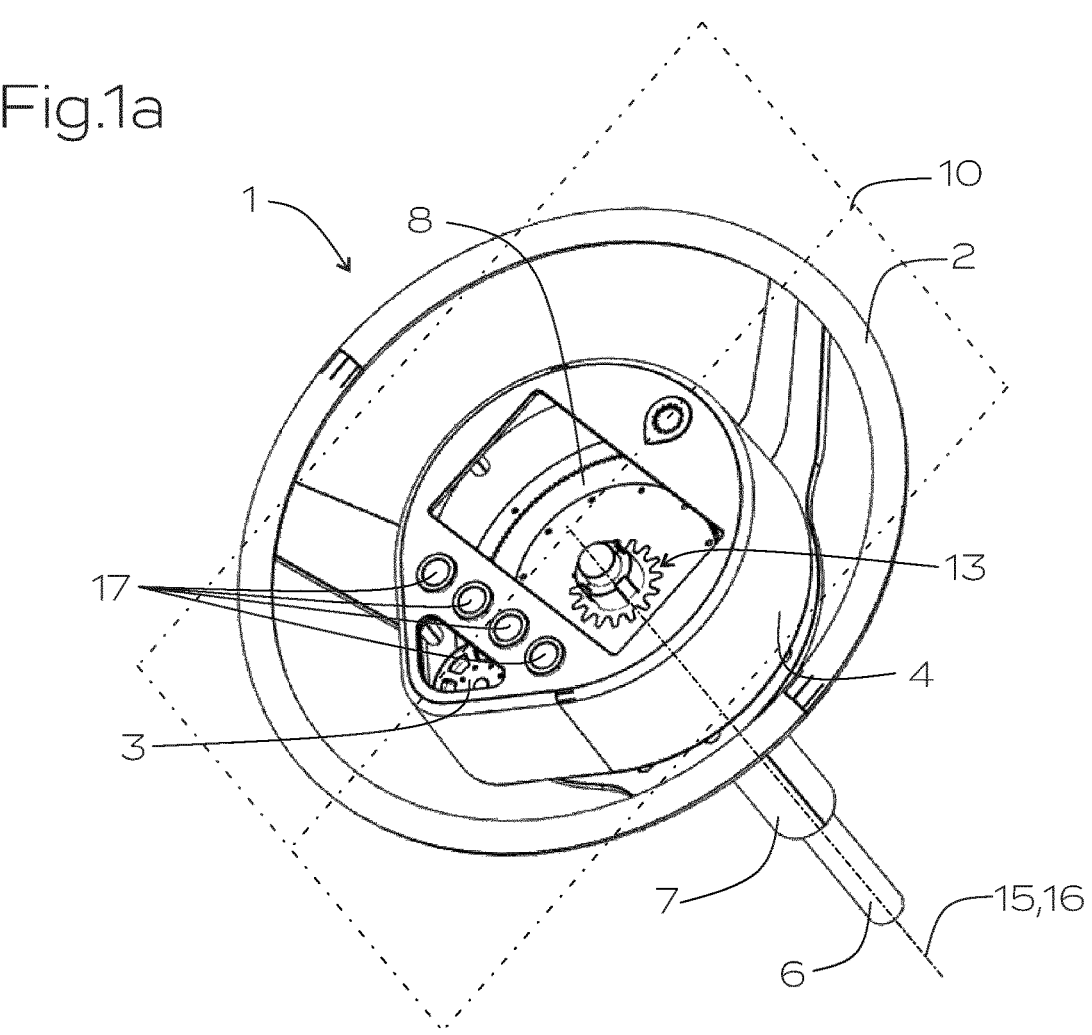
FIGS. 1a and 1b show schematic graphical three-dimensional representations of a first embodiment of the arrangement according to the invention.

Unless otherwise stated, the reference signs correspond to the following components: Steering device 1, steering wheel 2, motor 3, steering device housing 4, second connecting device 5, rotatable steering part 6, rigid steering part 7, first machine element 8, second machine element 9, sectional plane 10, motor pinion 11, first connecting device 12, receiving opening 13, axis of rotation of the third machine element 14, axis of rotation of the steering wheel 15, axis of rotation of the rotatable steering part 16, operating device 17, transmission 18, and third machine element 19.

Figure 1B:
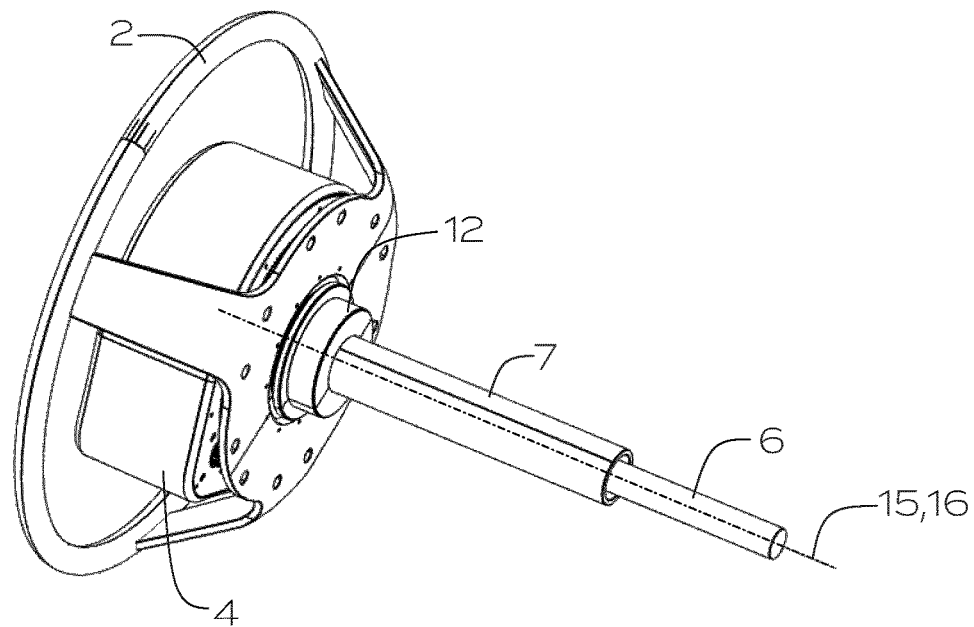
Figure 2:
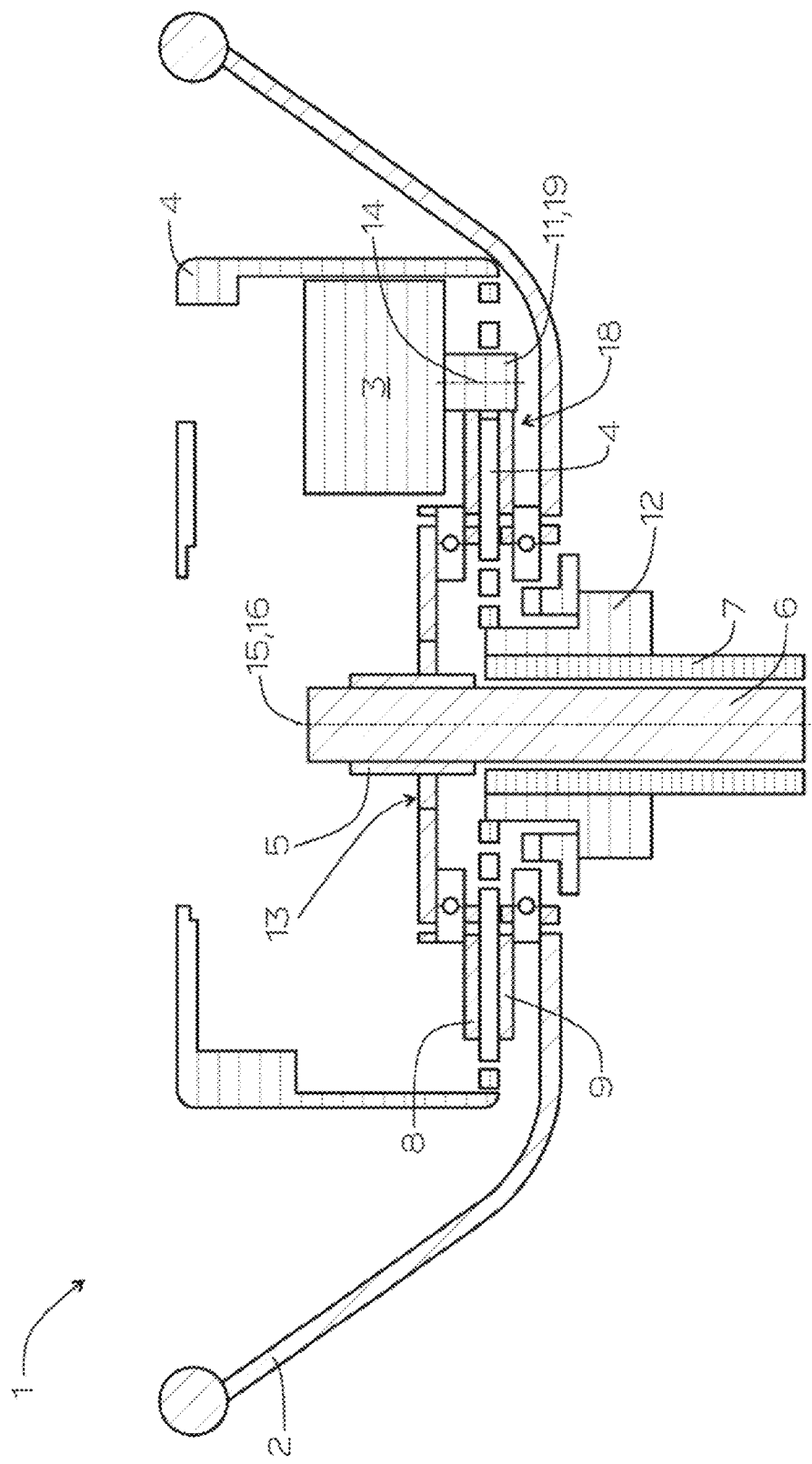
FIG. 2 shows a schematic graphical sectional view of the first embodiment along the sectional plane.

FIGS. 1a, 1b and 2 show schematic graphical representations of a first embodiment of the arrangement according to the invention. For better clarity, the parts that are unaffected by the rotation of the steering wheel 2 are hatched straight and the parts that are rotated by a rotation of the steering wheel 2 are hatched obliquely.

The steering device 1 is configured to be arranged on a steering system of a vehicle. In this embodiment, the vehicle is an agricultural vehicle, such as a tractor, for example.

The steering system comprises a rotatable steering part 6 and a rigid steering part 7. The position of at least one vehicle wheel can be adjusted by the rotation of the rotatable steering part 6, whereby the direction of travel of the vehicle can be influenced. The rigid steering part 7 is independent of the rotation of the rotatable steering part 6.

According to this embodiment, the rotatable steering part 6 is formed as steering shaft and the rigid steering part 7 is formed as tube in which the steering shaft is arranged.

The steering device 1 comprises a steering wheel 2, a motor 3, a transmission 18 and a steering device housing 4. The steering device 1 is designed to be arranged centrally within the steering wheel 2.

A first machine element 8, in particular a first gear rim, is arranged within the steering device housing 4. The first machine element 8 is form-fittingly connected to the rotatable steering part.

A second machine element 9, in particular a second gear rim, is arranged outside the steering device housing 4. The second machine element 9 is connected to the steering wheel in a form-fitting, force-fitting and/or material-fitting manner.

The first machine element 8 and the second machine element 9 are substantially identical and arranged concentrically. In other words, the axes of rotation of these two machine elements 8, 9 substantially correspond to each other. Further, these two machine elements 8, 9 extend substantially orthogonally to the axis of rotation of the rotatable steering part 16.

At least part of the steering device housing 4 extends between the first machine element 8 and the second machine element 9.

In this embodiment, the first 8 and the second machine element 9 are in contact with each other exclusively via the third machine element 19. According to this embodiment, the third machine element 19 is formed as motor pinion 11 of the motor 3.

According to this embodiment, the axis of rotation of the third machine element 14 and the axis of rotation of the steering wheel 15 extend substantially parallel to the axis of rotation of the rotatable steering part 16.

On the one hand, a rotation of the steering wheel 2 can be transmitted to the motor pinion 11 via the second machine element 9 and to the first machine element 8 and thus to the rotatable steering part 6 via the motor pinion 11.

On the other hand, however, a rotation of the motor pinion 11 can also be transmitted to the steering wheel 2 via the second machine element 9 and to the rotatable steering part 6 via the first machine element 8.

The steering wheel 2 is releasably connected and/or coupled to the rotatable steering part 6 via the first machine element 8, the second machine element 9, the third machine element 19, i.e., the motor pinion 11, and a second connecting device 5. The second connecting device 5 is formed as first toothed wheel.

According to this embodiment, it is provided that the first machine element 8 is connected to a receiving opening 13 via a connecting plate, the receiving opening 13 being configured to form-fittingly receive the second connecting device 5.

When the steering device 1 is installed, the connection of the steering device 1 to the steering system causes the first toothed wheel to be arranged in the receiving opening 13 so that the rotatable steering part 6 is form-fittingly connected to the steering wheel 2. Thus, rotations of the steering wheel 2 can be transmitted to the rotatable steering part 6.

The steering device housing 4 is connected to the rigid steering part via a first connecting device 12. According to this embodiment, the first connecting device 12 is formed as quick coupling.

According to this embodiment, for the removal of the steering device 1, after loosening the quick coupling, the steering device 1 can be removed from the first toothed wheel.

The steering device 1 comprises at least one steering device part, such as in particular at least one steering sensor, at least one antenna, at least one control device and/or at least one battery, which is not shown for clarity. The steering device parts are only connected to the steering device housing 4 so that they rest immobile during a rotation of the steering wheel 2.

Further, the steering device 1 comprises five operating devices 17, namely four buttons and a touch screen, the touch screen not being shown for clarity. All operating devices 17 are connected to the rigid steering part 7 and are arranged on the steering device housing 4. Further, the operating devices 17 are configured to operate the steering device 1 and/or the vehicle. The touch screen, which is not shown, points in the direction of the vehicle driver.

As a result of the fact that the steering device 1 and thus also the operating devices 17 are arranged substantially in the center of the steering wheel 2 centrally in front of the vehicle driver, no additional space is required in the vehicle.

Additionally, the operating devices 17 are connected to the rigid steering part 7, whereby they rest immobile during a rotation of the steering wheel 2. This allows easy reading and operation of the steering device 1 at any time.

According to this embodiment, the steering device 1 has a connecting element, namely a plug, through which the steering device 1 can be connected to the vehicle, the battery and/or a GNSS/GPS receiving device.

The line leading to the connecting element is arranged on the steering device housing 4 and optionally on the first connecting device 12 so that the line remains immobile during the rotation of the steering wheel 2 and the rotatable steering part 6. The connecting element and the line are not shown for clarity.

This configuration may be provided in all embodiments.

This exemplary configuration allows the effects according to the invention to be obtained.

The invention is not limited to the illustrated embodiments, but rather comprises any arrangement, steering device 1, steering wheel 2 and vehicle according to the following patent claims.

The invention claimed is:

1. An arrangement of a steering device for use with a steering system of a vehicle, wherein the steering system includes a rigid steering part and a rotatable steering part, wherein position of at least one vehicle wheel can be adjusted by rotating the rotatable steering part, and wherein the rotatable steering part can be rotated relative to the rigid steering part, the arrangement comprising:

a steering wheel coupled to the rotatable steering part via a transmission; and a motor configured to rotate the rotatable steering part;

wherein the transmission comprises a first machine element, a second machine element, and a third machine element, wherein the first machine element is rotationally connected to the rotatable steering part and is formed as a toothed wheel, wherein the second machine element is rotationally connected to the steering wheel and is formed as a toothed wheel, wherein the first machine element is coupled to the second machine element via the third machine element which is formed as a toothed wheel that is mounted for rotation about an axis of rotation, wherein the axis of rotation is arranged rigidly relative to the rigid steering part; and wherein the arrangement of the steering device including both the steering wheel and the motor is releasably connected to the rigid steering part and the rotatable steering part of the steering system.

2. The arrangement according to claim 1, wherein:
the first machine element and the second machine element are concentrically arranged.

3. The arrangement according to claim 1, further comprising:
a steering device housing releasably connected to the rigid steering part;
wherein the steering device housing extends at least partially between the first machine element and the second machine element.

4. The arrangement according to claim 3, wherein:
the third machine element comprises a motor shaft or motor pinion configured to protrude through the steering device housing and connect the first machine element and the second machine element.

5. The arrangement according to claim 3, further comprising:
at least one steering device part selected from the group consisting of at least one steering sensor, at least one antenna, at least one control device, and at least one battery, wherein the at least one steering device part is connected to the steering device housing.

6. The arrangement according to claim 1, wherein:
the axis of rotation of the third machine element extends substantially parallel or orthogonally to an axis of rotation of the rotatable steering part, and/or
an axis of rotation of the steering wheel substantially corresponds to the axis of rotation of the rotatable steering part.

7. The arrangement according to claim 1, wherein:
the rotatable steering part is surrounded by the rigid steering part, and/or
the rigid steering part substantially extends parallel to an axis of rotation of the rotatable steering part, and/or
the rotatable steering part is arranged inside the rigid steering part.

8. The arrangement according to claim 1, further comprising:
at least one operating device, wherein the at least one operating device is connected to the rigid steering part, whereby the at least one operating device is immobile during the rotation of the steering wheel and the rotatable steering part, and wherein the at least one operating device is configured to operate the steering device and/or the vehicle.

9. The arrangement according to claim 1, wherein:
the steering device is configured to be removable from the steering system.

10. The arrangement according to claim 1, further comprising:
a first connecting device arranged for quick coupling to the rigid steering part in a force-fitting, form-fitting and/or material-fitting manner.

11. The arrangement according to claim 1, further comprising:
a second connecting device comprising a toothed wheel coupled to the rotatable steering part in a force-fitting, form-fitting and/or material-fitting manner, wherein at least one of the first machine element, the third machine element, the second machine element, and the steering wheel is releasably connected to the rotatable steering part via the second connecting device.

12. The arrangement according to claim 1, further comprising:
a battery and/or a Global Navigation Satellite System (GNSS)/Global Positioning System (GPS) receiving device releasably connected to the steering device via a connecting element, wherein at least one line leading to the connecting element is immobile during the rotation of the steering wheel and the rotatable steering part.

13. The arrangement according to claim 1, wherein;
the vehicle is an agricultural machine.

14. The arrangement according to claim 1, wherein;
the steering wheel is configured to be connected to the rigid steering part.

15. A vehicle comprising the arrangement of claim 1.

16. The arrangement according to claim 1, wherein:
the first machine element substantially corresponds to the second machine element.

17. The arrangement according to claim 1, wherein:
axes of rotation of the first machine element and the second machine element substantially correspond to an axis of rotation of the rotatable steering part.

18. The arrangement according to claim 1, wherein:
the first machine element and the second machine element extend substantially orthogonally to an axis of rotation of the rotatable steering part.

* * * * *